United States Patent Office 3,539,598
Patented Nov. 10, 1970

3,539,598
SELECTIVE DEGRADATION OF 16-METHYL-17-OH-20-KETO STEROIDS
Marcel Gut, Worcester, Mass., assignor to Phytogen Products, Inc., Mamaroneck, N.Y., a corporation of Delaware
No Drawing. Filed May 29, 1967, Ser. No. 642,163
Int. Cl. C07c *169/20*
U.S. Cl. 260—397.3      4 Claims

ABSTRACT OF THE DISCLOSURE

The present invention describes a selective degradation of 16-methyl-17-OH-20-keto steroid with alkali metal bismuthate. The resulting 16-methyl-17-keto steroids of the following formula are novel compounds.

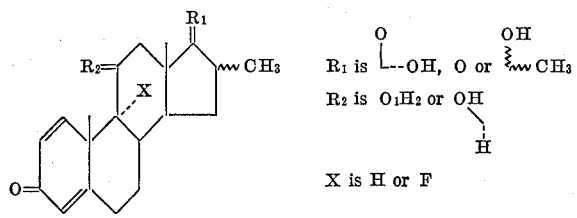

$R_1$ is L--OH, O or ⁵ʷCH₃
$R_2$ is O, H₂ or OH\H
X is H or F

---

This invention relates to steroids, and more particularly to 16-methyl-17-keto steroid compounds which are useful as anabolic agents with what seems negligible androgenicity. This invention relates also to a method for degrading 16-methyl-20-keto-17-hydroxy steroids into 17-keto steroids. The compounds may be represented by the following formula:

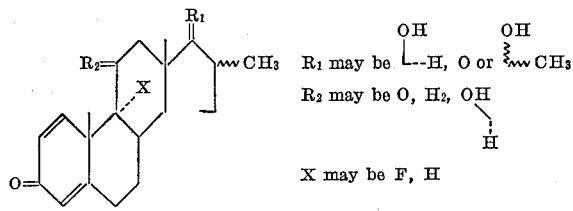

$R_1$ may be L--H, O or ⁵ʷCH₃
$R_2$ may be O, H₂, OH\H
X may be F, H

These compounds can be formed from known and available precursors by first introducing the 9α-fluoro when desired, and the 16-methyl group into an appropriate 17α-hydroxy, 20-keto or hydroxy pregnane compound, then effecting the present degradation reaction. Thus, dexamethasone can be degraded with alkali metal bismuthate according to practice of this invention into the desired steroids.

The primary 17-ketosteroids obtained from the present reaction can be converted to other derivatives by applying well-known, even conventional reactions. Thus the primary product from the degradation of dexamethasone ((I) 11β - hydroxy - 9α - fluoro-16α-methylandrosta-1,4-diene-3,17-dione) can be converted to a 17β-hydroxyl derivative ((II) 11β,17β-dihydroxy-9α-fluoro-16α-methylandrosta-1,4-dien-3-one) by a conventional sodium borohydride reduction, which is in this case selective to the extent that Δ¹,⁴-3-ketone moiety is attacked to a minor degree. Moreover, the same primary degradation product (I) is readily oxidized to 9α-fluoro-16α-methylandrosta-1,4-diene-3,11,17-trione (III) with chromium trioxide in aqueous acetic acid. This very same compound can be formed by direct degradation of 17α-, 21-dihydroxy-9α-fluoro - 16α - methyl - pregna - 1,4-diene-3,11,20-trione. By employing 16α-methyl prednisone and 16α-methyl prednisolone as starting materials, the 17-keto pair of compounds (without the 9α-fluoro substituent) (Va, Vb) may be obtained. Reduction of either one of the pair of leads to 11β-, 17β-dihydroxy-16α-methyl-androsta-1,4-dien-3-one (VIa, b). Similarly, the 16α-methyl-Δ¹-derivative of substance "S" on degradation gives a product with no oxygen function at position 11. (This compound is, however, not quite so desirable because of slightly higher androgenicity.) Other methods are known to the art for effecting similar degradations. For example, chromic acid degradation is known to convert the dihydroxyacetone side chain of the corticoids directly to the appropriate 17-keto steroids. Such reaction lacks selectivity, since secondary alcohol functions elsewhere in the molecule will be co-oxidized, and double bonds may be attacked. Consequently, for lack of selectivity, the yields of the desired substance are low. Other known methods of degradation such as periodate oxidation and use of lead tetra-acetate suffer from a similar lack of selectivity in degradation of a highly substituted steroid molecule.

The present method of degradation employs an alkali metal (e.g. sodium) bismuthate. Aqueous acetic acid has been found to be an excellent medium for this reaction. It may be noted that the reaction mixture is rather heterogenic with only a minor portion of the steroid in solution and good stirring is essential. The yields of degraded products are remarkably good.

The various reactions involved in preparation of the compounds of the present invention may be seen from the following formula sequence and are further illustrated by the examples which follow.

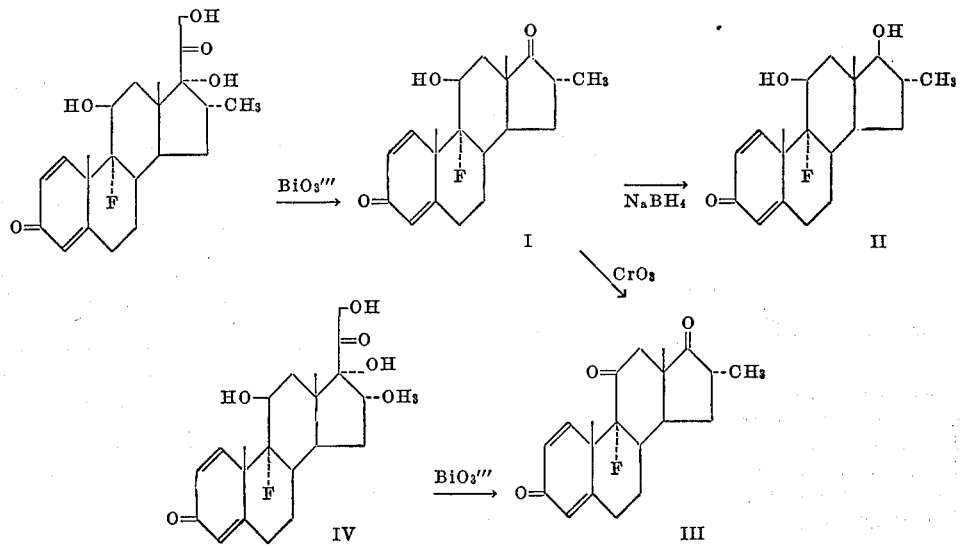

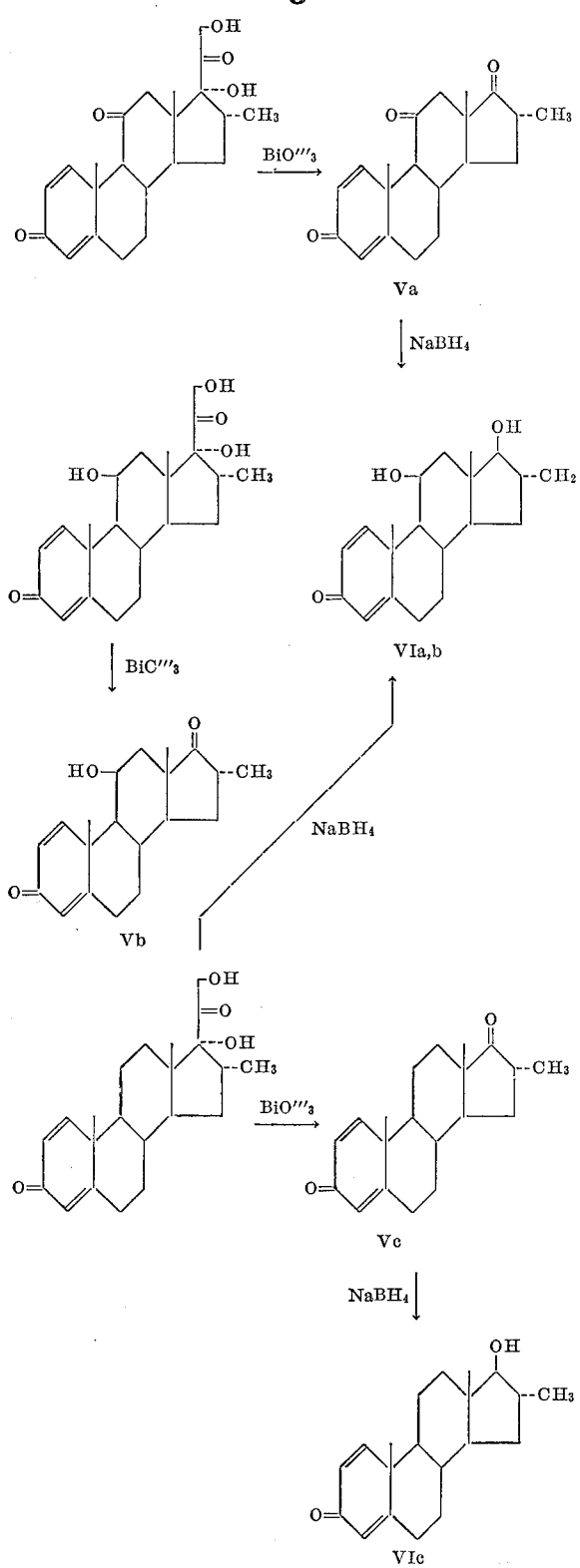

EXAMPLE I

11β-hydroxy-9α-fluoro-16α-methylandosta-1,4-diene-3,17-dione (I)

One part of dexamethasone (11β,17α-21-trihydroxy-9α-fluoro-16α-methyl-pregna-1,4-diene-3,20-dione) in 60 parts of 50% acetic acid was shaken overnight with 10 parts of sodium bismuthate. The reaction mixture was cooled in an ice bath and 10 parts of sodium bisulfite in 30 parts of water added. Then 100 parts of water were added, and finally concentrated hydrochloric acid added until the salts dissolved. This mixture was extracted with dichloromethane and the extracts were washed successively with water, 2 N sodium carbonate, and water, then dried and concentrated. 0.8 part of crude crystals was isolated by filtration, which on recrystallization from benzene-hexane gave a purified sample of (1) with M.P. 245–249° C.

The infrared spectrum of this compound showed the following major bands:

$\nu_{max}^{KBr}$: 2.80, 3.45, 5.76, 5.98, 6.10, 6.19, 6.89, 7.23, 7.69, 8.08, 9.90, 10.83, 11.27μ

EXAMPLE II

11β,17β-dihydroxy-9α-fluoro-16α-methyl-androsta-1,4-dion-3-one (II)

0.2 part of the degradation product (1) obtained in Example I was dissolved in 40 parts of methanol and reacted with 0.038 part sodium borohydride, while cooled in a bath of ice and water. After one hour of reaction, a few drops of acetic acid were added and the reaction mixture concentrated in vacuo. The residue was extracted in hot benzene. From the benzene extract was obtained 0.2 part of white crystals, which on one recrystallization from ethyl acetate-hexane afforded 0.17 part of material M.P. about 172° C.

The infrared spectrum of this compound showed the major peaks:

$\nu_{max}^{KBr}$: 2.85, 3.36, 5.98, 6.12, 6.21, 6.86, 7.06, 7.70, 8.06, 9.40, 9.82, 10.12, 10.57, 10.71, 11.95, 12.01, 14.32μ

EXAMPLE III

9α-fluoro-16α-methylandrosta-1,4-diene-2,11,17-trione (III)

To a solution of 1 part of (I) (11β-hydroxy-9α-fluoro-16α-methylandrosta-1,4-diene-3,17-dione) in 25 parts of 90% acetic acid, was added slowly a solution of 0.4 part of chromium trioxide in 90% acetic acid (50 parts). After 5½ hours at room temperature (+25°), the reaction mixture was poured into a large volume of water and extracted with ether. The ether extract was washed with 2 N sodium hydroxide solution, saturated sodium chloride, dried and concentrated. The residue proved to be a mixture, and could not be purified by crystallization. It was chromotographed in silica gel and eluted with benzene-ethyl acetate. From the chromatography product was obtained 0.5 g. of material with M.P. 207–210° C.

The infrared spectrum had the salient bands seriatim:

$\nu_{max}^{KBr}$. 3.33, 5.76, 5.95, 6.10, 6.19, 6.85, 7.20, 7.74, 8.04, 9.59, 10.04, 11.14, 12.22μ

EXAMPLE IV

9α-fluoro-16α-methylandrosta-1,4-diene-3,11,17-trione (III)

By bismuthate degradation of 17α-21-dihydroxy-9α-fluoro-16α-methylpregna-1,4-diene-3,11,20-trione (IV).

One part of (IV) in 60 parts of 50% acetic acid was shaken overnight with 10 parts of sodium bismuthate. The reaction mixture was treated as described in Example I. 0.82 part of crude crystals was isolated. Recrystallization from benzene-hexane gave a purified sample: M.P. 199–201° C. (0.67 part). No depression in melting point could be observed when admixed with (III), prepared via chromic acid oxidation of (I). The infrared spectrum of the degradation product was in all details identical with (III) prepared via the chromic acid route (Example III).

It should be noted that (III) prepared via bismuthate degradation did not need chromatography for purification, whereas the chromic acid product (Example III) did.

EXAMPLE V

The following substances were degraded with sodium bismuthate exactly as described in Example I.

| Starting material, 1 part | Product obtained, parts |
|---|---|
| (a) 16α-methylprednisone | 16α-methylandrosta-1,4-diene-3,11,17-trione, 0.72 part. |
| (b) 16α-methylprednisolone | 11β-hydroxy-16α-methyl-androsta-1,4-diene-3,17-dione, 0.78 part. |
| (c) 16α-methyl-Δ¹-"S" which is: 17α,21-dihydroxy-16-methylpregna-1,4-diene-3,20-dione. | 16α-Methylandrosta-1,4-diene-3,17-dione, 0.81 part. |

EXAMPLE VI

The following 17-ketosteroidal degradation products were reduced with sodium borohydride as described in Example II, with the exceptions in the amounts of sodium borohydride used as noted below:

| Starting-17-ketosteroid, 0.2 part | NaBH₄ used, parts | Compound obtained |
|---|---|---|
| (a) 16α-methylandrosta-1,4-diene-3,11,17-trione. | 0.080 | 11β,17β-dihydroxy-16α-methyl-androsta-1,4-dien-3-one. |
| (b) 11β-hydroxy-16α-methyl androsta-1,4-diene-3,17-dione. | 0.040 | Same as above. |
| (c) 16α-methylandrosta-1,4-diene-3,17-dione. | 0.045 | 17β-hydroxy-16α-methylandrosta-1,4-dien-3-one. |

What is claimed is:
1. The compound: 11β,17β dihydroxy-9α-fluoro-16α-methylandrosta-1,4-diene-3-one.
2. The compound: 9α-fluoro-16α-methylandrosta-1,4-diene-3,11,17-trione.
3. The compound: 11β-hydroxy-16α-methylandrosta-1,4-diene-3,17-trione.
4. The compound: 11β,17β-dihydroxy-16α-methylandrosta-1,4-diene-3-one.

References Cited

UNITED STATES PATENTS 3,264,331  8/1966  Robinson et al. ____ 260—397.5

OTHER REFERENCES

Fresir et al.: "Steroids" (1959), Reinhold Publishing Corporation, New York, pp. 329 and 479 relied on.

Dyerassi: "Steroid Relations" (1963), Holden-Day, p. 135 relied on.

Bernstein et al.: "Chemistry and Industry" (1961), p. 546 relied on.

ELBERT L. ROBERTS, Primary Examiner

U.S. Cl. X.R.

260—397.45